United States Patent [19]
Choi et al.

[11] Patent Number: 6,101,524
[45] Date of Patent: Aug. 8, 2000

[54] DETERMINISTIC REPLAY OF MULTITHREADED APPLICATIONS

[75] Inventors: Jong-Deok Choi, Mount Kisco; Harini Srinivasan, Tarrytown, both of N.Y.

[73] Assignee: International Business Machines Corporation, Armonk, N.Y.

[21] Appl. No.: 08/956,717

[22] Filed: Oct. 23, 1997

[51] Int. Cl.[7] .................................. G06F 9/00; G06F 9/45
[52] U.S. Cl. .............................. 709/102; 710/6; 710/264; 717/4
[58] Field of Search .................................. 395/704, 650; 709/102

[56] References Cited

U.S. PATENT DOCUMENTS

| | | | |
|---|---|---|---|
| 5,179,702 | 1/1993 | Spix et al. ............................... | 709/102 |
| 5,247,675 | 9/1993 | Farrell et al. ............................ | 709/103 |
| 5,339,415 | 8/1994 | Strout, II et al. ....................... | 709/102 |
| 5,490,272 | 2/1996 | Mathis et al. ........................... | 709/108 |
| 5,812,844 | 9/1998 | Jones et al. ............................. | 709/104 |
| 5,892,944 | 4/1999 | Fukumoto et al. ...................... | 709/100 |
| 5,913,925 | 6/1999 | Kahle et al. ............................. | 712/206 |
| 5,968,157 | 10/1999 | Joy et al. ................................. | 710/200 |
| 5,999,986 | 12/1999 | McCauley, III et al. ............... | 709/310 |
| 6,006,247 | 12/1999 | Browning et al. ...................... | 709/102 |

OTHER PUBLICATIONS

Tullsen et al.; "Simultaneous Multithreading: Maximizing On–Chip Parallelism". ACM Digital Library[online], May 1995 International Conference on Computer Architecture, pp. 392–403.

Nikhil et al.; "*T: A Multithreaded Massively Parallel Architecture". ACM Digital Library[online], International Conference on Computer Architecture, pp. 156–167, May 1992.

Hirata et al.; "An Elementary Processor Architecture with Simultaneous Instruction Issuing from Multiple Threads". ACM Digital Library[online], International Conference on Computer Architecture, pp. 136–145, May 1992.

Fiske et al.; "Thread Prioritization: A Thread Scheduling Mechanism for Multiple–Context Parallel Processors". Future Generation Computer Systems, vol. 11, No. 6, pp. 503–518, Jan. 1995.

Kodama et al.; "Message–Based Efficient Remote Memory Access on a Highly Parallel Computer EM–X". IEICE Transactions on Information and Systems, vol. E79–D, No. 8, Aug. 1996.

Runyon, S.; "Test Software Goes Visual to Conserve Time". Electronic Engineering Times, Issn. 0192–1541, Dec. 1996.

Fogelin, J.; "Graphical Interfaces Speed Debugs". Electronic Engineering Times, pp. 50, Issn. 0192–1541, Jul. 1994.

(List continued on next page.)

*Primary Examiner*—Kevin J. Teska
*Assistant Examiner*—Kelvin E. Booker
*Attorney, Agent, or Firm*—F. Chau & Associates, LLP

[57] ABSTRACT

A multithreaded program includes sequences of events wherein each sequence is associated with one of a plurality of execution threads. In a record mode, the software tool of the present invention records a run-time representation of the program by distinguishing critical events from non-critical events of the program and identifying the execution order of such critical events. Groups of critical events are generated wherein, for each group $G_i$, critical events belonging to the group $G_i$ belong to a common execution thread, critical events belonging to the group $G_i$ are consecutive, and only non-critical events occur between any two consecutive critical events in the group $G_i$. In addition, the groups are ordered and no two adjacent groups include critical events that belong to a common execution thread. For each execution thread, a logical thread schedule is generated that identifies a sequence of said groups associated with the execution thread. The logical thread schedules are stored in persistent storage for subsequent reuse. In a replay mode, for each execution thread, the logical thread schedule associated with the execution thread is loaded from persistent storage and the critical events identified by the logical thread schedule are executed.

24 Claims, 9 Drawing Sheets

S0: START, i=0
S1: update FirstCriticalEvent(i) and LastCriticalEvent(i)
S2: yield the thread schedule
S3: CriticalEvent; increment the g-clock
S4: i = i + 1
S5: END C1: g-clock < FirstCriticalEvent(i)
C2: not C1
C3: g-clock <=LastCriticalEvent(i)
C4: not C3
C5: i<=last interval
C6: not C5

OTHER PUBLICATIONS

Karatza, H.D.; "Multitasking and Resequencing in a Two-Stage Multiprocessing System". ACM Digital Library [online], Proceedings of the 1996 Winter Simulation Conference, Feb. 1996.

Koenemann-Belliveau et al.; "Comparative Usability Evaluation: Critical Incidents and Critical Threads", ACM Digital Library[online], Proceedings from the Conference on Human Factors in Computing Systems, Apr. 1994.

Karimi et al.; "A Partitioning Technique for Concurrent Software Design", IEEE/IEE electronic Library[online], Journal of Systems and Software, vol. 33, Iss. 1, pp. 15–35, Apr. 1996.

Gosling et al.; "The Java Language Specification". Reading, MA: Addison-Wesley. Chapter 17, Sep. 1996.

Cook et al.; "Designing Object-Oriented Systems: Object-Oriented Modeling with Syntropy". New York, NY: Prentice Hall, Chapter 9., Sep. 1994.

S0: START, i=0
S1: update FirstCriticalEvent(i) and
 LastCriticalEvent(i)
S2: yield the thread schedule
S3: CriticalEvent; increment the g-clock
S4: i = i + 1
S5: END C1: g-clock < FirstCriticalEvent(i)
C2: not C1
C3: g-clock <=LastCriticalEvent(i)
C4: not C3
C5: i<=last interval
C6: not C5

Fig. 10

DETERMINISTIC REPLAY OF MULTITHREADED APPLICATIONS

BACKGROUND OF THE INVENTION

1. Technical Field

The invention relates to computer processing systems and, more particularly, to tools, such as debugging tools and visualization tools, for replaying the execution of programs on such computer processing systems.

2. Description of the Related Art

Modern operating system platforms support concurrent multiple threads of execution. Some of these operating system platforms support concurrent multiple threads without complete scheduling control by the user. For example, operating system platforms that support the Java™ Virtual Machine Specification fall into this category. In such systems, each time a Java™ program runs, the time allocated to each unsynchronized thread may change as these times are under the control of an external operating system. The apparently random time allocation to threads introduces non-deterministic program behavior. Other events such as windowing events, network events/messages and general input output operations may also introduce non-deterministic program behavior. Such program execution is referred to below as a non-deterministic execution instance.

Such non-deterministic program behavior takes away the benefits of using execution replay for debugging, performance monitoring, or visualization, or other similar tasks. For example, repeated execution of a program is common while debugging a program, and non-determinism may disallow a bug that appeared in one execution instance of the program from appearing in another execution instance of the same program. Non-determinism also affects visualization of the execution behavior of a program since execution behaviors can be different for different execution instances of the program. Current cyclic debugging, i.e., repeated execution for debugging, and monitoring-based tools such as visualizers, do not support deterministic re-execution.

Thus, there is a need in art to provide a software tool that provides deterministic replay of a non-deterministic execution instance.

SUMMARY OF THE INVENTION

The above stated problems and related problems of the prior art are solved with the principles of the present invention, deterministic replay of multithreaded applications. A multithreaded program includes sequences of events wherein each sequence is associated with one of a plurality of execution threads. In a record mode, the software tool of the present invention records a run-time representation of the program by distinguishing critical events from non-critical events of the program and identifying the execution order of such critical events. Groups of critical events are generated wherein, for each group $G_i$, critical events belonging to the group $G_i$ belong to a common execution thread, critical events belonging to the group $G_i$ are consecutive, and only non-critical events occur between any two consecutive critical events in the group $G_i$. In addition, the groups are ordered and no two adjacent groups include critical events that belong to a common execution thread. For each execution thread, a logical thread schedule is generated that identifies a sequence of said groups associated with the execution thread. The logical thread schedules are stored in persistent storage for subsequent reuse.

In a replay mode, for each execution thread, the logical thread schedule associated with the execution thread is loaded from persistent storage and the program is re-executed maintaining the order of critical events identified by the logical thread schedule.

BRIEF DESCRIPTION OF THE DRAWINGS

FIGS. 2(*a*), (*b*), (*c*), and (*d*) illustrate possible physical thread schedules for an exemplary program.

DETAILED DESCRIPTION OF THE PREFERRED EMBODIMENTS

Figure 1:
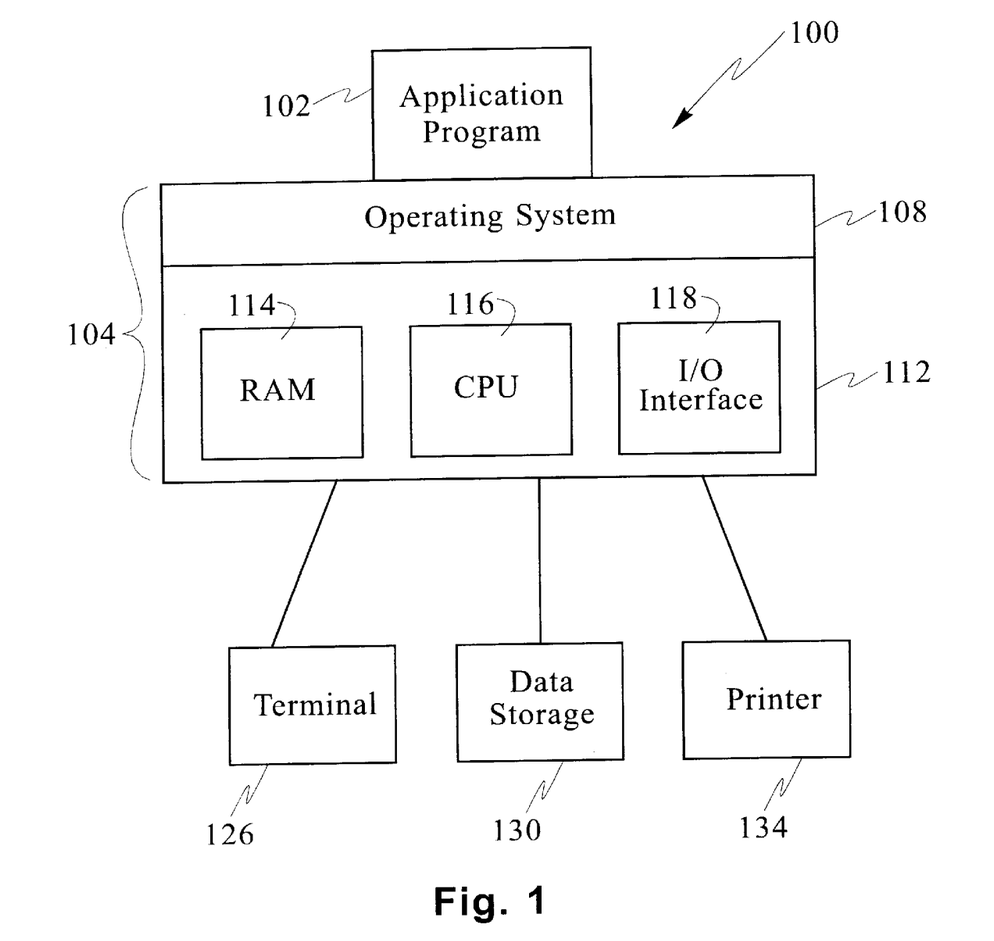
FIG. 1 illustrates an example of a computer processing system on which the present invention may be implemented.
Figure 2A:
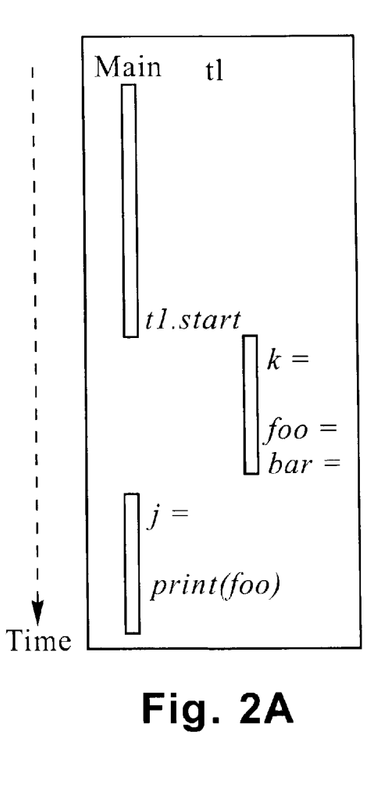
Figure 2B:
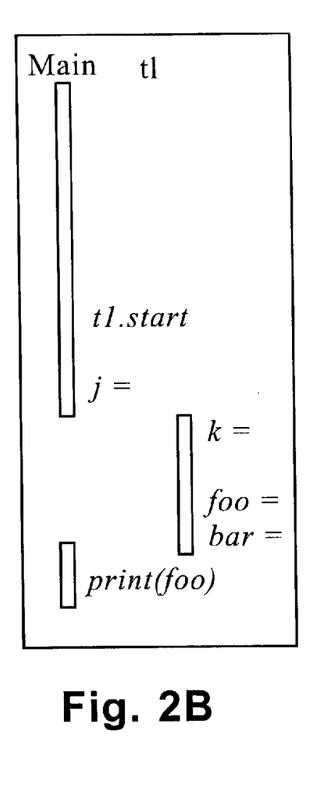
Figure 2C:
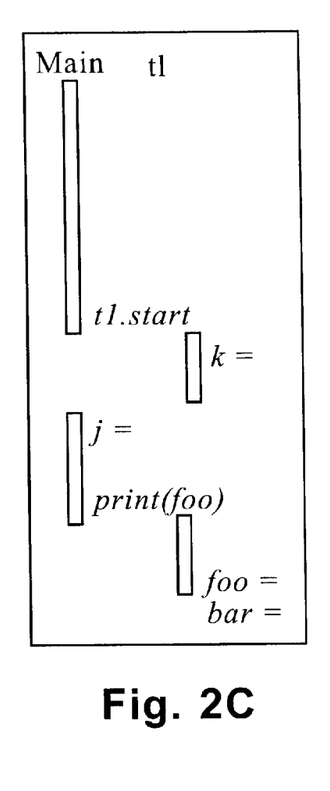
Figure 2D:
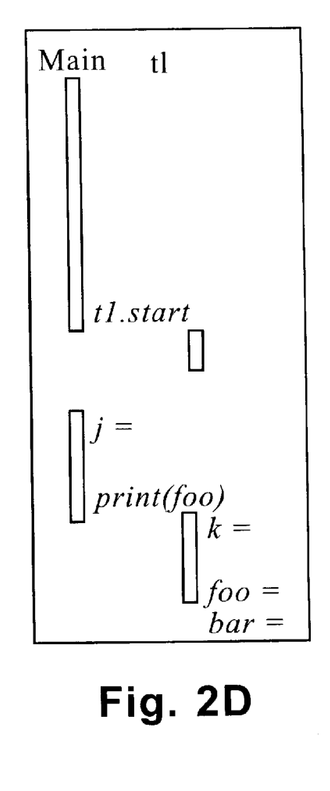

Referring now to FIG. 1, there is shown a block diagram showing a computer system 100 on which a preferred embodiment of the present invention operates. The computer system 100 includes one or more application programs 102 and an operating system 108 that operate on a computer platform 104. The platform 104 includes a hardware unit 112 that includes one or more central processing units 116 (which are typically referred to as CPUs/processors), a random access memory (RAM) 114, and an input/output interface 118. Various peripheral components may be connected to the computer platform 104 including a terminal 126, a data storage device 130, and a printing device 134. The operating system 108 coordinates the operation of the various components or the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

The operating system 108 of the present invention provides multi-threading capabilities wherein multiple concurrent threads of control are dispatched within a single shared address space. Examples include the built-in thread support of operating systems supporting the Java™ Virtual Machine, Microsoft's Windows NT operating system, and the POSIX threads package that is available on many operating systems, for instance as the pthreads package of IBM's AIX operating system.

According to the present invention, a software tool is provided that operates as an application program 102 on the computer platform of FIG. 1. The software tool provides the deterministic replay of a non-deterministic execution instance of a program. The software tool operates in two modes:

in a record mode, the tool records the logical thread schedule information of the execution while the program runs.

in a replay mode, the tool reproduces the execution behavior of the program by enforcing the recorded logical thread schedule information.

Replaying a multithreaded program involves capturing the thread schedule information during one execution of the program and reproducing the exact same schedule while replaying the execution. A thread schedule of a program is essentially a sequence of time intervals (time slices). Each interval in this sequence corresponds to the execution of a single thread. Thus, interval boundaries correspond to thread switch points. We refer to the thread schedule information obtained from a thread scheduler as the physical thread schedule information, and each time interval in a physical thread schedule as physical schedule interval.

Physical thread schedule information may not be directly accessible. In such instances, a logical thread schedule information can be computed without direct access to the thread scheduler. To better understand the notion of logical thread schedule, consider a simple multithreaded Java™ program:

```
Class Test {
    static  public volatile int foo = 0; // shared variable
    static  public volatile int bar = 20; // shared variable
    static  public void main(String argv[ ]) {
            int j; // local variable
            MyThread t1 = new MyThread( );
            t1.start( );
            j = 20;
            System.out.println("foo =" + foo + "j = " + j);
        }
    }
class MyThread extends Thread   {
    public void run( ) ;
    int k; // local variable
    k = 5;
    Test.foo = Test.foo + k;
    Test.bar = Test.bar - k;
        }
}
```

Here, thread main starts a child thread, t1. Both main and t1 access the shared variable, foo. The variables j and k are local to threads main and t1 respectively.

FIG. 2 depicts a few execution instances (physical thread schedules) of the example program on a uniprocessor machine: time is marked in the vertical direction. In FIG. 2(a), the shared variable foo is incremented by t1 before main can print the value of foo. Hence, for this execution, the value printed is 5. The difference between the execution instance in FIGS. 2(a) and (b) is that, in the latter, variable j is updated before thread t1 starts executing. The value of foo printed by thread main is still 5. However, in FIG. 2(c), main prints the value of foo before t1 updates it. Hence, the value printed is 0. Likewise, in FIG. 2(d), the value of foo that gets printed by main is 0. The difference between the thread schedules (c) and (d) lies in the order of local variable accesses. In (c), k is updated before the shared variable foo is accessed by thread main and in (d), k is updated after foo is accessed in main.

Capturing the Execution Behavior of the Program

On a multithreaded uniprocessor system, each thread is assigned to time slices during which only events of the thread get executed. A physical thread schedule identifies a sequence of time slices and the thread assigned to each time slice.

The execution behavior of a physical thread schedule is different from that of another physical thread schedule if the order of shared variable accesses is different in the two thread schedules. A variable local to a method is accessible only by the thread that has instantiated the variable, and is therefore also local to the thread. A variable that is *not* local to any thread is a shared variable, which can be accessed by more than one thread. In Java, a variable is any location within a Java™ program that a value may be stored into. A variable is local to a method if (1) it is declared as a (formal) parameter of the method; (2) declared inside the block that defines the method (called the method block); or (3) declared inside a block nested in the method block. Shared variables are variables that are *not* local to any thread.

Moreover, synchronization events can potentially affect the order of shared variable accesses, and thus affect the physical thread schedules. For example, a Java™ Virtual Machine provides several flavors of synchronization:

monitorenter, monitorexit are instructions that mark the begin and end respectively of a critical section. The semantics of a critical section is that only one thread can execute the section of code at any given time. A different thread can enter the critical section only after the first has executed the monitorexit operation. However, threads compete to enter a critical section, and during different execution instances, threads may acquire access to the critical section in different orders. Synchronized methods and blocks can be implemented using the monitorenter and monitorexit instructions.

wait, notify, notifyAll are instructions that can be used to coordinate the execution order of multiple threads. A thread that has executed a wait operation on an object must wait to be notified by a different thread executing a notify operation on the same object. The thread that executes the notify operation on an object wakes up an arbitrary thread waiting on the same object. The notifyAll operation can be used to wake up all the corresponding waiting threads.

suspend and resume are instructions used to coordinate the execution order. A thread can execute a suspend operation that suspends the execution of another thread or itself. The suspended threads must be explicitly resumed by another thread executing the resume operation.

Finally, it is possible for a thread to execute an interrupt operation that interrupts the execution of a thread at any point.

All of the above synchronization operations affect the execution order of threads, which in turn can affect the order of shared variable accesses and hence the physical thread schedules.

In addition, the interactions between synchronization operations in the user application are themselves part of the application and have to be reproduced for the user to correctly understand their program behavior. It is therefore imperative, in a record/replay tool, to capture all these synchronization events and the shared variable accesses in order to reproduce the exact same execution behavior of the program. Synchronization events and shared variable accesses of a thread are collectively referred to below as critical events.

It is possible to classify physical thread schedules with the same execution behavior into equivalence classes. More specifically, let s1 and s2 be two physical thread schedules for the same program execution with the same inputs. Let t1, t2, . . . , tn be threads executing in schedules s1 and s2. Schedules s1 and s2 are equivalent if the critical events and their order are the same in s1 and s2. In the example presented above, the schedules shown in FIGS. 2(a) and (b) belong to the same equivalence class. Likewise, the schedules shown in FIGS. 2(c) and (d) belong to one equivalence class.

The software tool of the present invention preferably refers to all the physical thread schedules belonging to an equivalence class as a logical thread schedule. Thus, if physical schedules s1 and s2 are equivalent, they correspond to the same logical thread schedule. More specifically, a logical thread schedule is a sequence of intervals of critical events, wherein each interval corresponds to the critical events executing in a specific thread. Preferably, a given interval satisfies the following properties:

1. all critical events of the interval belong to the same thread;
2. all critical events of the interval are consecutive;
3. only non-critical events can occur between consecutive critical events in the interval; in other words, given any two critical events c1 and c2 of an interval, all critical events of the thread between c1 and c2 also belong to this interval; and
4. no two adjacent intervals belong to the same thread.

Note that it is not necessary to trace each critical event individually—in particular, for a particular logical schedule, if multiple critical events always occur in succession and are not separated by a thread switch, it suffices to trace the critical event interval, i.e., the first critical event and the last critical event. Tracing the critical event interval rather than every critical event reduces the space requirements for the traces, and consequently improves the performance of the replay tool. For example, in FIG. 2, in both the logical schedules, the shared variables foo and bar are accessed in thread t1, uninterrupted by thread switches, in the order foo; bar; foo. Rather than trace each of these critical events, we simply trace the first access to foo and the last access to foo in t1. Before proceeding to discussing record and replay of critical events, we now formalize the notion of logical thread schedule and discuss how such schedules can be captured.

The data representing the logical thread schedule of a program execution preferably consists of a set of thread-specific logical schedules each corresponding to a thread created during the execution as follows:

logical_thread_schedule_for_execution={thread_specific_logical_schedule[1], . . , thread_specific_logical_schedule[i], . . . , thread_specific_logical_schedule[number_of_threads]}.

The thread-specific logical schedule of a thread consists of a list of logical schedule intervals (LSI's) each corresponding to an interval during which the specific thread is scheduled for execution as follows:

thread_specific_logical_schedule[i]={LSI[0], . . . , LSI[j], . . . , LSI[last-1]}

The list is preferably implemented as a linked list during the record phase, when the number of logical schedule intervals is not known a priori. It is preferably implemented as an array during the replay phase, when the number is known a priori.

The logical schedule interval corresponding to an interval i when the specific thread is scheduled for execution, denoted LSI[i], identifies the critical event(s) that occur in the given interval i. Preferably, LSI[i] is an ordered pair <FirstCriticalEvent[i], LastCriticalEvent[i]> wherein FirstCriticalEvent[i] identifies the first critical event in the interval i and LastCriticalEvent[i] identifies the last critical event in the interval i. Preferably, the value of FirstCriticalEvent[i] and LastCriticalEvent[i] represent a global clock value that indicates the time that the corresponding event was executed. Such global clock values identify the ordering of events in the execution stream.

Figure 3:
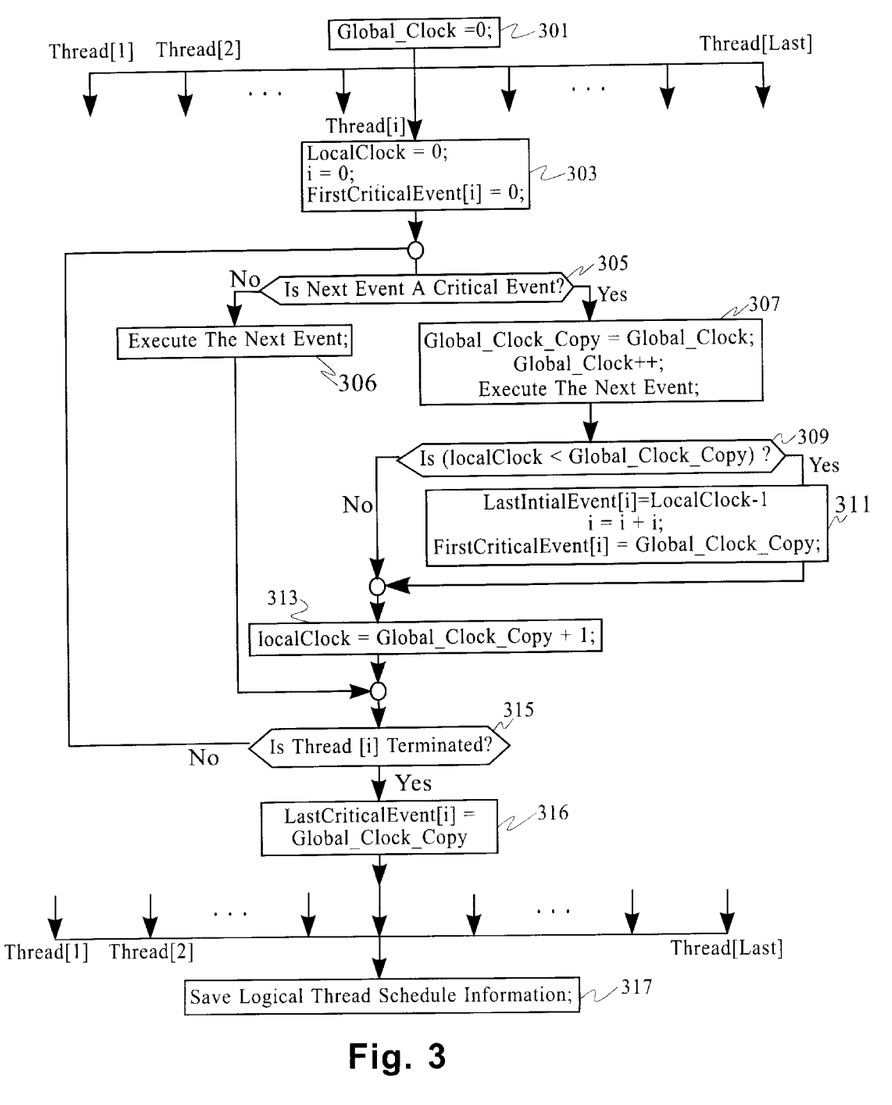
FIG. 3 is a flow chart illustrating the operations of the software tool of the present invention in record mode.

The logical thread schedule of the present invention as described above preferably is generated using a global clock and a local clock. An example of the operations in capturing the logical thread schedule is illustrated in FIG. 3. The operations begin in step 301 by initializing the variable GLOBAL_CLOCK to 0. GLOBAL_CLOCK is shared by all threads generated by the physical thread scheduler during the execution of the program. Such threads are denoted as thread[1] through thread[last]. The physical thread scheduler creates such threads in a serial fashion. The software tool of the present invention deterministically assigns a thread identifier to the newly created thread and passes the thread identifier to the newly created thread. The thread identifier is initialized to 0 and incremented automatically for each thread created. For each thread, a thread-specific logical thread schedule is computed (steps 303 through 315). The figure shows the steps for thread[i] in detail as a representative case.

In step 303, a variable localClock is initialized to 0 and the first logical schedule interval of the thread is created with the initial GLOBAL_CLOCK (0) as its first critical event. Steps 305–315 form a loop that terminates when the thread terminates. For each instruction to be executed in the thread (i.e., the next event), in step 305 it is determined whether the instruction is a critical event. If not, control branches to step 306 wherein the instruction is executed and the operation continues to step 315. Upon execution of the instruction, the processing system identifies the next instruction in the execution sequence. If in step 305 it is determined that the instruction is a critical event, then operation continues to step 307 wherein an atomic operation is performed that executes the critical event, makes a copy GLOBAL_CLOCK_COPY of the current value of GLOBAL_CLOCK and updates GLOBAL_CLOCK. An example of the atomic operation is described below with respect to FIG. 5. In this example, the GCCriticalSection represents such atomic operation. Upon execution of the instruction, the processing system identifies the next instruction in the execution sequence. After step 307, operation continues to step 309.

In step 309, it is determined whether there is a gap between GLOBAL_CLOCK_COPY and localClock. The value of GLOBAL_CLOCK, which is reflected in GLOBAL_CLOCK_COPY, can be updated by all the threads; yet localClock can only be updated by the thread that owns it. Therefore, localClock cannot be greater than GLOBAL_CLOCK_COPY. If localClock is equal to GLOBAL_CLOCK_COPY, a thread switch has not occurred between the last event and the current event, and the operation continues to step 313. If localClock is less than GLOBAL_CLOCK_COPY, a thread switch has occurred between the last event and the current event, and the operation continues to step 311 wherein the current logical schedule interval LSI[i] is completed with the value (localClock-1) as its LastCriticalEvent[i], the counter i is incremented, and a new logical schedule is created with GLOBAL_CLOCK_COPY as its FirstCriticalEvent[i]. In step 311, all threads other than the main thread have an initial interval <0, -1>, which is ignored.

After step 311, the operation continues to step 313 wherein GLOBAL_CLOCK_COPY is incremented and localClock is updated to the incremented value of GLOBAL_CLOCK_COPY. In step 315, it is determined if the current event is the last event of the thread. If not, the operation returns to step 305 and steps 305 to 315 are repeated. If so, the operation continues to step 316 wherein the last logical schedule interval LSI[i] of the terminating thread is completed with the value GLOBAL_CLOCK_COPY as its LastCriticalEvent[i].

Finally, after all the threads have terminated, in step 317, the logical thread schedule information for all the threads is saved in a file.

Figure 4:
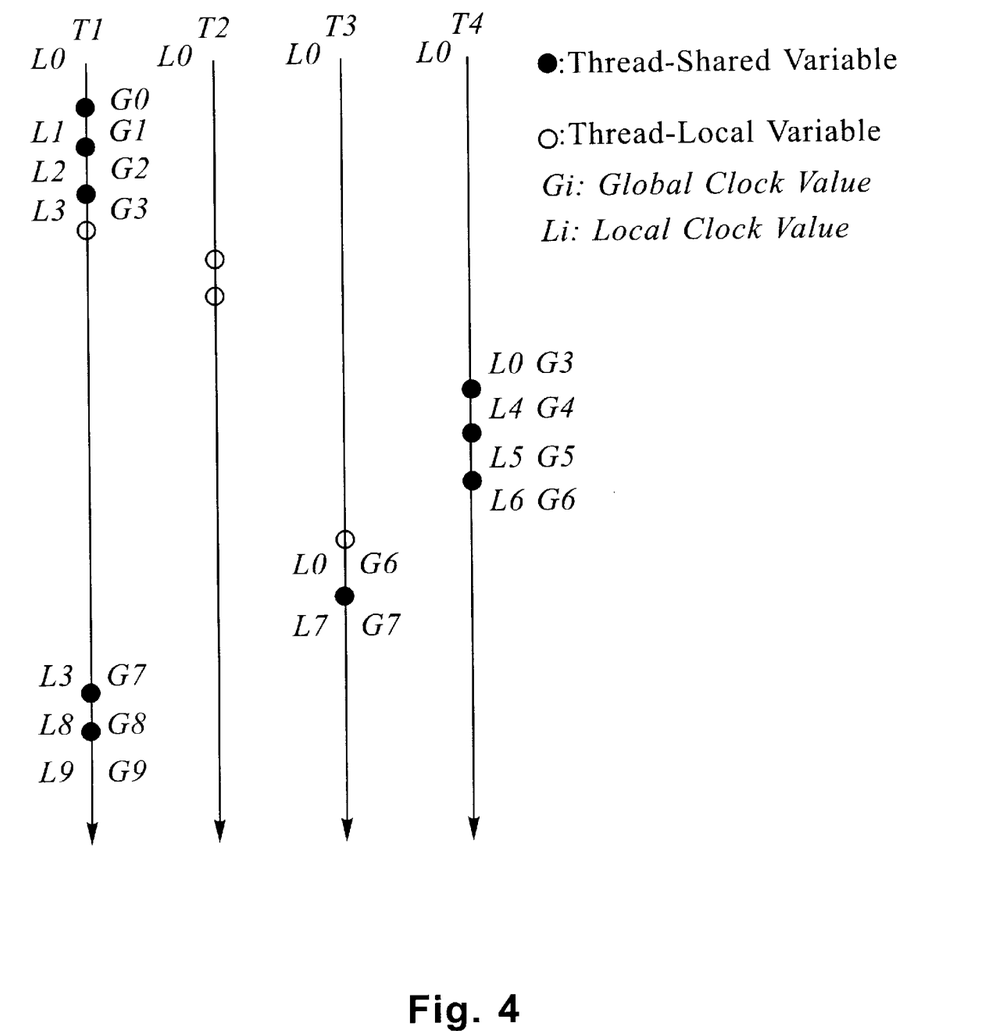
FIG. 4 illustrates an example of the operations of FIG. 3 for four threads.

FIG. 4 illustrates an example of the operations of FIG. 3 for four threads: T1, T2, T3, and T4. The vertical lines indicate time. T1 is the first thread scheduled by the thread scheduler. T1 executes three accesses to shared variables followed by one access to a local variable. Then, a thread switch happened, and the thread T2 is scheduled in. After accessing two local variables, T2 is scheduled out, and T4 was scheduled in, and so on.

The logical thread schedule intervals for the threads T1,T2,T3 and T4 is as follows:

T1: <0;2>,<7;8>

T2: empty

T3: <6;6>

T4: <3;5>

Note that thread T2's execution does not contain any critical event and hence, nothing has to be traced for T2. Consider T1. There are five critical events in T1 (in this case all of them correspond to shared variable accesses). The first three critical events occur in succession, and then, there are two thread switches before the next two critical events. The first three critical events of T1 correspond to global clock values 0, 1 and 2 respectively. The 3rd and 4th critical events correspond to global clock values 7 and 8, respectively. Hence, two thread switch intervals are computed for T1, <0; 2> and <7; 8>.

As described above, a global clock is used to order the critical events by assigning a unique, increasing value to each critical event. Since multiple threads execute critical events and update the same global clock, the following three operations are required to be executed as a single atomic action during the record phase:

AssignGlobalClock: assigning the global clock value to a local copy;

UpdateGlobalClock: incrementing the global clock; and

CriticalEvent: execution of a critical event.

Generally, CriticalEvent can be placed anywhere in the block and the AssignGlobalClock operation must be executed prior to UpdateGlobalClock operation. This is true for most critical events, but may be relaxed for some synchronization events, as will be discussed below. For most synchronization events, execution of the synchronization event (critical event) is not part of the atomic operation; however the operation of assigning the global clock value to a local copy and incrementing the global clock are part of the atomic action.

Figure 5:
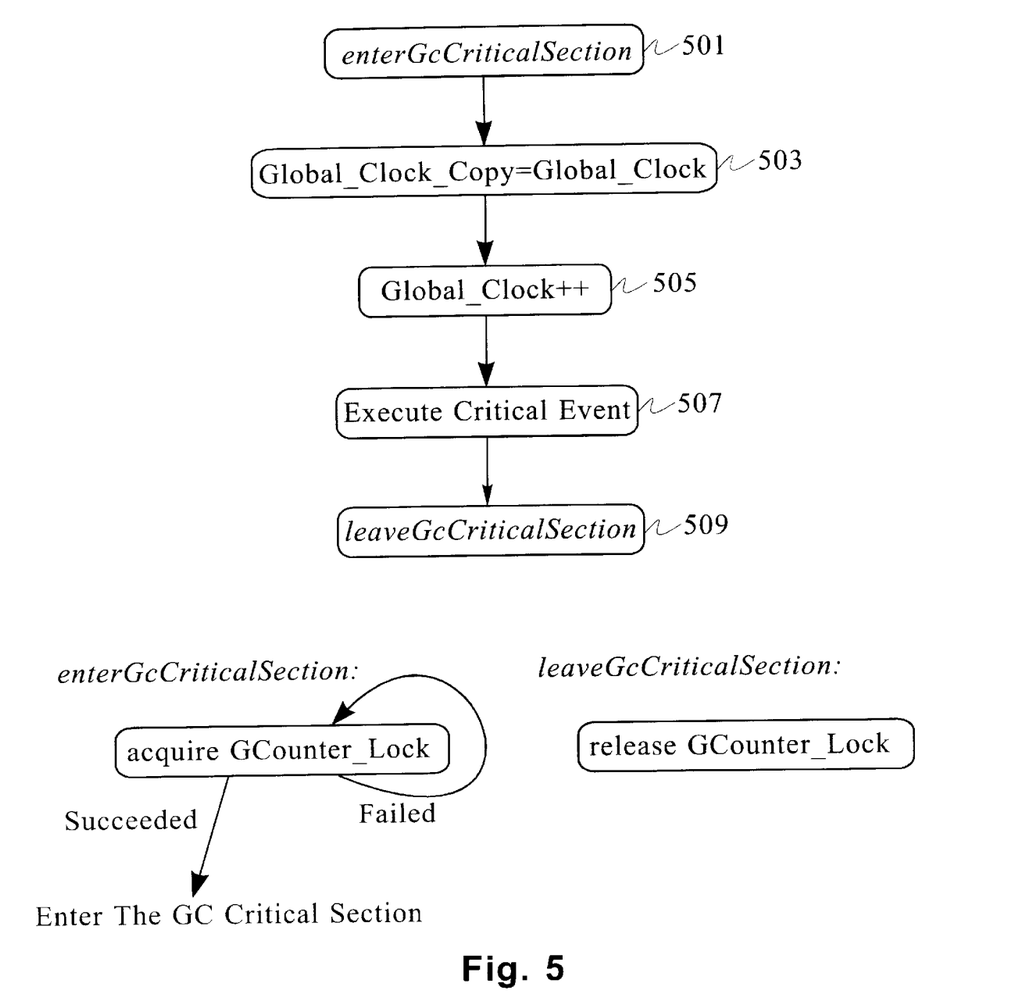
FIG. 5 illustrates the operations that perform the atomic action of step 307 of FIG. 3 for critical events that represent a shared-variable access.

An example of the operations in performing such an atomic action, denoted a GcCriticalSection, is illustrated in FIG. 5. In Steps 501 and 509, the thread acquires and releases, respectively, a global lock (GCounter_Lock). One way to implement the global lock of steps 501 and 509 is to define a variable GCounter_Lock that when set to '0' indicates that no thread holds the global lock and when set to '1' indicates that a thread holds the global lock. The current thread acquires the global lock in step 501 by performing a loop that waits until GCounter_Lock is set to '0'; and upon determining that the GCounter_Lock is set to '0', sets it to '1' and exits the loop. To release the global lock in step 509, the thread sets GCounter_Lock to '0'.

Once a thread (thread [i]) acquires a global lock (GCounter_Lock), no other thread can acquire the global lock until thread[i] releases the global lock (i.e., by completing execution of step 509). This ensures that the operations between steps 501 and 509 (i.e., steps 503,505,507) are atomic. In step 503, a local copy of the GLOBAL_CLOCK, denoted GLOBAL_CLOCK_COPY, is assigned to the current value of GLOBAL_CLOCK. In step 505, GLOBAL_CLOCK is incremented. And in step 507, the critical event is executed.

The operations of FIG. 5 are applicable to critical events that represent a shared variable access. However, such operations may not be directly applicable to all other critical events, namely some synchronization operations because of the semantics of such synchronization operations. For example, the semantics of the synchronization operations supported by a Java™ Virtual Machine require modifications to the operations outlined above in FIG. 5.

More specifically, the Java™ Virtual machine supports synchronization blocks and methods that correspond to user-defined critical sections. The implementation of such critical sections is done using the monitorenter and monitorexit operations that lock and release respectively an event object. The operations of FIG. 5, when applied to these operations, could result in deadlock situations. This is because, by definition of monitorenter and monitorexit semantics, only one thread can reside in the monitor.

Figure 6:
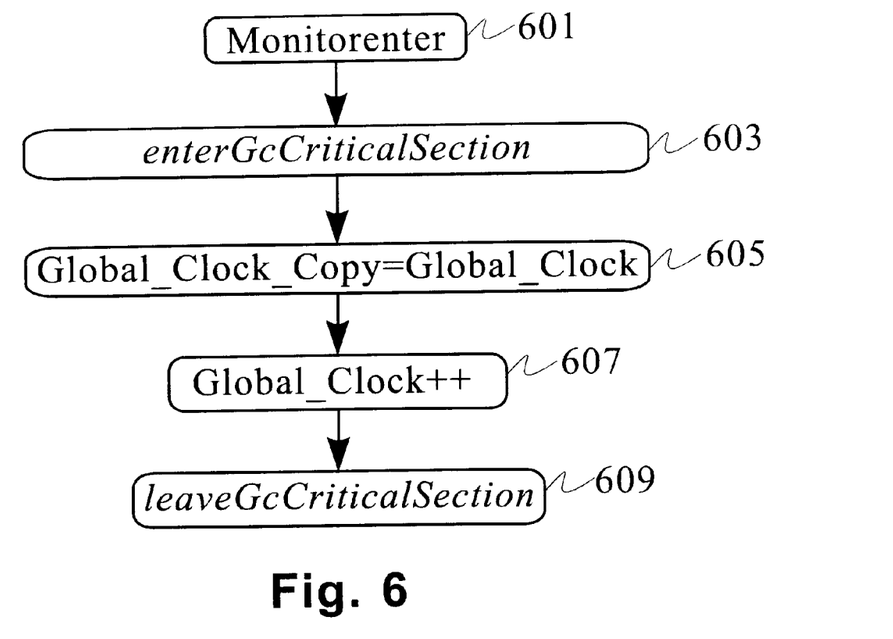
FIG. 6 illustrates the operations that perform the atomic action of step 307 of FIG. 3 for critical events that represent, or are semantically equivalent to, a monitorenter( ) sychronization instruction.

FIG. 6 illustrates a modification of the operations of FIG. 5 to accommodate the monitorenter operation. The monitorexit operation can be handled as illustrated in FIG. 5. In FIG. 6, the monitorenter is executed in step 601 before entering the GcCriticalSection, step 603. Steps 603, 605, 607, 609 are the same as steps 501, 503, 505, 509, respectively, of FIG. 5. By executing the monitorenter operation before entering the GcCriticalSection, deadlock is avoided. Since only one thread can be in the GcCriticalSection, the correct order of entering the GcCriticalSection after the execution of monitorenter operation is recorded.

Figure 7:
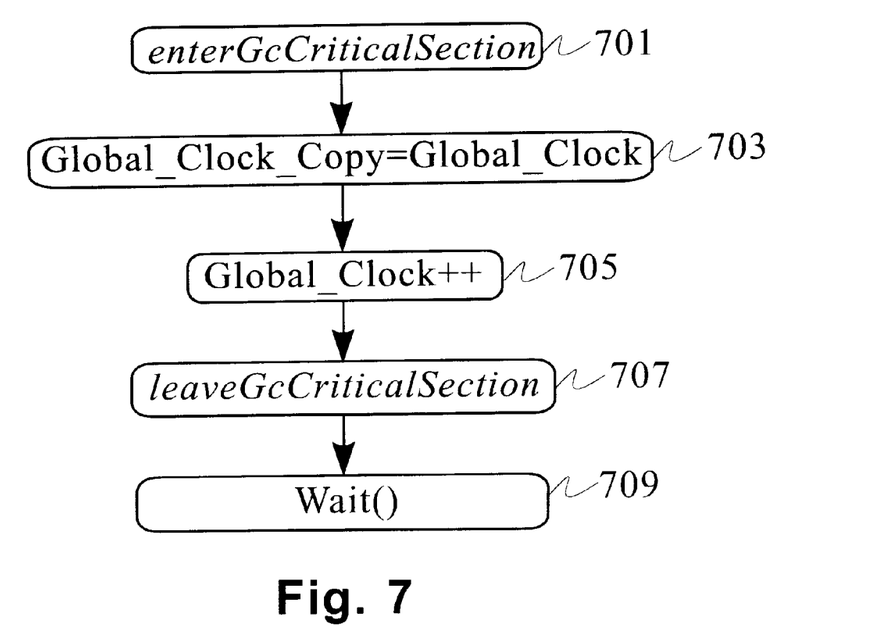
FIG. 7 illustrates the operations that perform the atomic action of step 307 of FIG. 3 for critical events that represent, or are semantically equivalent to, a wait( ) sychronization instruction.

In addition, the Java™ Virtual Machine also supports event synchronization in the form of wait( ), notify( ) and notifyAll( ) operations. Since a wait( ) is a blocking operation (i.e., the thread executing wait( ) suspends and can not proceed until another thread issues a notify( ) or notifyAll( )), the operations of FIG. 5 may cause deadlock when the critical event corresponds to a wait( ). FIG. 7 illustrates modifications to the operations of FIG. 5 to handle the wait( ) critical event. As shown in FIG. 7, the wait( ) operation is performed in step 709 after the GcCriticalSection. Steps 701, 703,705, 707 correspond to steps 501,503, 505,509 respectively of FIG. 5. It is possible to execute the wait( ) after the GcCriticalSection because the wait( ) operation occurs inside a synchronized block that locks an event object. Hence, a corresponding notify( ) and notifyAll( ) operation can not execute until the wait( ) executes and releases the lock on the event object. The implementation of the atomic operation corresponding to notify( ) and notifyAll( ) does not require any special attention as long as it is deterministic. We say a notify( ) and notifyAll( ) operation is deterministic if the order in which the threads waiting on an event object are woken up by the notify( ) or notifyAll( ) depends on the order of execution of the wait( )s by the different threads. However, this may not always be the case and handling non-deterministic execution of notify( ) and notifyAll( ) will depend on the specific implementation of the Java™ Virtual Machine.

In addition, the Java™ Virtual Machine allows a thread to suspend itself or other threads via the suspend( ) operation. The difference between a wait( ) and suspend( ) is that the latter does not execute within a synchronized block. When a thread suspends another thread, i.e., executes suspend (other), the operations of FIG. 5 can be applied to atomically capture the suspend(other) and the global clock update. However, when a thread suspends itself (suspend(self)), the solutions presented above are not applicable. The solution for wait( ) can not be applied here because suspend(self) is not executed within a synchronized block. Hence, the time gap between leaving the GcCriticalSection and executing the suspend(self) operation may result in incorrectly capturing the order of critical events.

Figure 8:
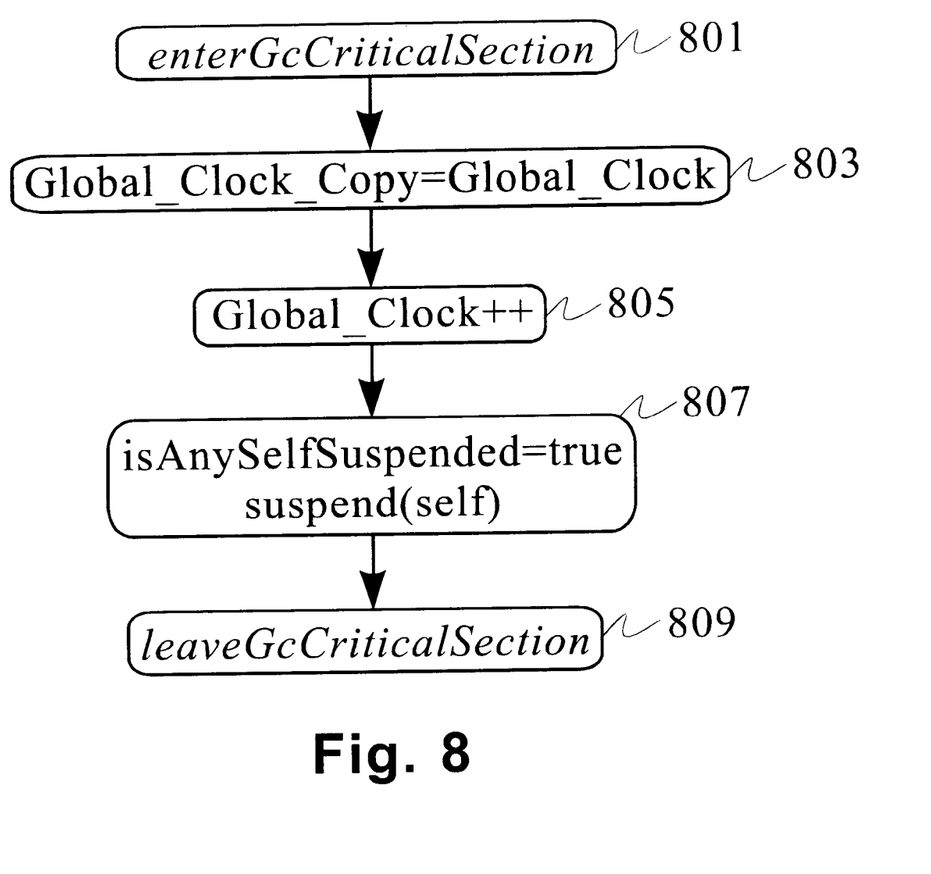
FIG. 8 illustrates the operations that perform the atomic action of step 307 of FIG. 3 for critical events that represent, or are semantically equivalent to, a suspend(self) sychronization instruction.

In order to allow a thread to suspend itself inside the GcCriticalSection, another thread must release the GCounter_Lock so that the program execution can proceed. If there is a system call facility that allows other threads to determine if a specific thread is in a suspended state, a thread that requires access to the GcCriticalSection can immediately release the GCounter_Lock (i.e., executes leaveGcCriticalSection (step 809)) on behalf of the self-suspended thread. If no such system call facility is available, a mechanism is used that relies on fairness in scheduling among threads. More particularly, a scheduling assumption may be made, i.e., every active thread gets a thread schedule slice of non-trivial amount of time before any other thread gets two schedule slices. In this case, each thread is forced to yield the schedule when it first detects a self-suspended thread. If a thread detects the same self-suspended thread a second time around, it releases the GCounter_Lock (i.e., executes leaveGcCriticalSection (step 809)) on behalf of the self-suspended thread. In a system with different priorities associated with the threads, only threads with priority not higher than the self-suspended thread should release the GCounter_Lock (i.e., executes leaveGcCriticalSection (step 809)) on behalf of the self-suspended thread.

Figure 9:
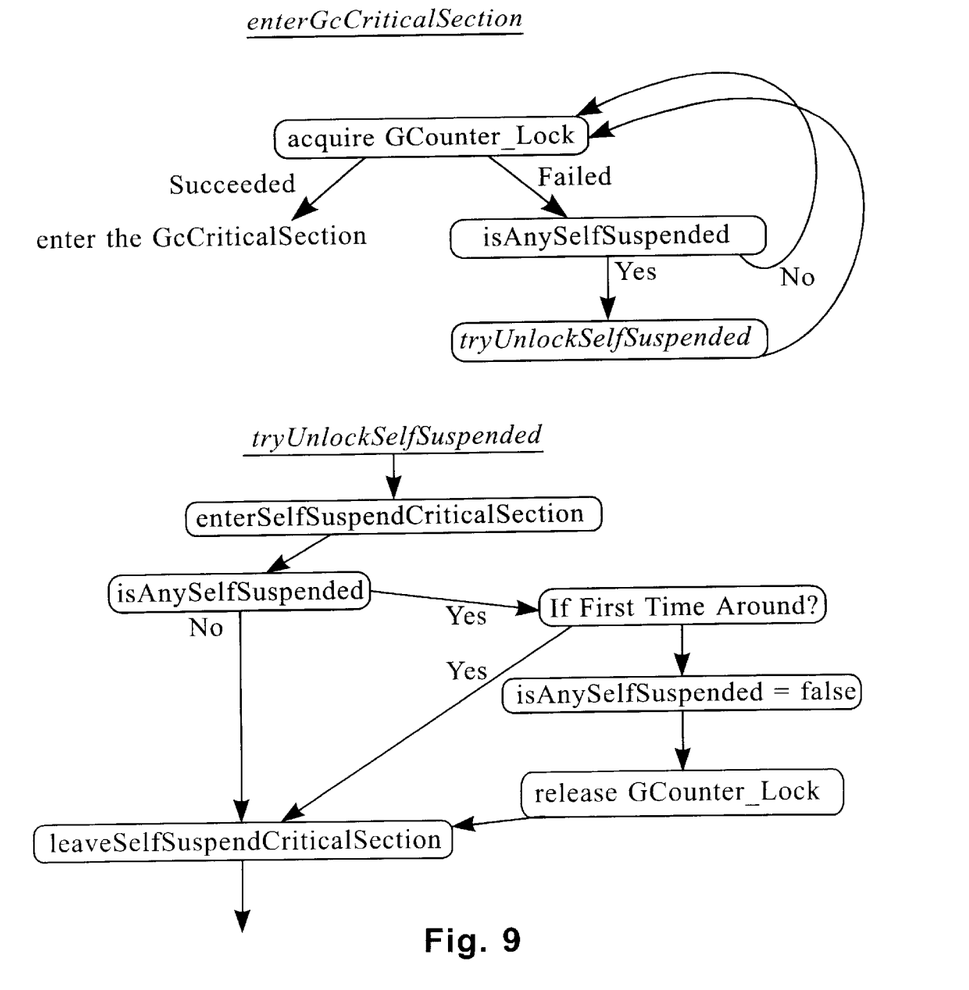
FIG. 9 illustrates the operations that perform the enterGcCriticalSection of step 801 of FIG. 8.

To accommodate the suspend(self) operation, the operations of FIG. 8 are used. The operations in FIG. 8 are similar to the operations of FIG. 5; however, the enterGcCriticalSection of step 801 is modified as shown in FIG. 9 and a flag isAnySelfSuspended is set to true and then the suspend(self) operation is executed in step 807. Step 809 is in fact a no-op since leaveGcCriticalSection is executed by some other thread on behalf of the self-suspended thread.

As illustrated in FIG. 9, the enterGcCriticalSection of step 801 attempts to acquire GCounter_Lock. If the attempt is successful, the operation continues to step 803. If the attempt fails, i.e., the thread is not able to enter the GcCriticalSection, the isAnySelfSuspended flag is evaluated to determine if there are any self-suspended threads. If so, the thread tries to release the GCounter_Lock on behalf of the self-suspended thread (executed by "tryUnlockSelfSuspend"). If there is no self-suspended threads, it simply waits to acquire the GCounter_Lock and the above process repeats.

The operation of tryUnlockSelfSuspend involves entering another critical section, the SelfSuspendCriticalSection, locked by a different lock variable called the SelfSuspendLock. If the thread enters this critical section, it first checks to see if there is any self suspended thread. This check can be accomplished via a system call facility that allows other threads to determine if a specific thread is in a suspended state. If no such system call facility is available, a mechanism may be used that relies on fairness in scheduling among threads to determine if a specific thread is in a suspended state.

An example of such a mechanism is illustrated in the tryUnlockSelfSuspended routine of FIG. 9. This mechanism relies on the following scheduling assumption: every active thread gets a thread schedule slice of non-trivial amount of time before any other thread gets two schedule slices. In this case, each thread is forced to yield the schedule when it first detects a self-suspended thread. If a thread detects the same self-suspended thread a second time around, it releases the GCounter_Lock (i.e., executes leaveGcCriticalSection (step 809)) on behalf of the self-suspended thread. In a system with different priorities associated with the threads, only threads with priority not higher than the self-suspended thread should release the GCounter_Lock (i.e., executes leaveGcCriticalSection (step 809)) on behalf of the self-suspended thread.

As illustrated in FIG. 9, if the isAnySelfSuspended flag indicates there are no self suspended threads, the SelfSuspendCriticalSection is left by releasing the SelfSuspendLock. If the isAnySelfSuspended flag indicates there is a self suspended thread, the thread checks to see if it has entered the SelfSuspendCriticalSection for the first time around for this particular self-suspend operation. If so, it leaves the SelfSuspendCriticalSection. If not, it sets the isAnySelfSuspended flag to false and releases the GCounter_Lock, effectively executing the leaveGcCriticalSection on behalf of the self-suspended thread. By not releasing the GCounter_Lock on behalf of the self-suspended thread the first time around, each thread is forced to yield the schedule when it first detects a self-suspend operation. After executing the "tryUnlockSelfSuspend", the thread tries to acquire the GCounter Lock again.

In addition, the notify, notifyAll, resume and interrupt operations can be handled as illustrated in FIG. 5.

In order to handle interactions between a wait( ) operation and a suspend( ) operation, consider the following. Assume T1 is about to wait on an event and has just finished the GC-critical section for it. Also assume this is followed by T2 suspending T1. There are three possible cases:

1) T2 suspends T1 before T1 successfully invokes a wait( ) operation;
2) T2 suspends T1 after T1 successfully invokes a wait( ) operation; and
3) T2 suspends T1 after T1 successfully invokes a wait( ) operation and a third thread wakes up T1 (via a notify( ) or interrupt( ) operation).

Case 3 does not introduce any interference between wait( ) and suspend( ) operations, and there is no need for any special treatment in this case. Probably, this case is what the user intended.

Case 1 and Case 2 are the same as far as T1 is concerned: T1 becomes inactive. Also, there is no difference in terms of the global clock values for the wait( ) operation and the suspend( ) operation: the clock value of wait( ) operation precedes that of the suspend( ) operation. However, there is a difference between the two in terms of their impact on other threads. In Case 1, T1 still holds all the locks it owns when it becomes inactive (from the suspend( ) operation executed by T2), preventing other threads waiting for any of the locks from proceeding any further. In Case 2, T1 releases all the locks it owns when it becomes inactive (from the wait( ) operation executed by itself), allowing other threads waiting for the locks to proceed.

The implication of the difference between Case 1 and Case 2 on the software tool is that the software tool could produce two different execution behaviors, one for Case 1 and the other for Case 2. The solution employed by the software tool to handle such an interaction between wait( ) and suspend( ) operations is similar to the solution for self-suspend. Specifically, a thread sets a "wait-flag" in the GC-critical section before it executes the wait( ) operation. Such a flag is unique for each wait( ) operation. When the thread wakes up from the wait( ) operation (in response to a notify( )/notifyAll( ) executed by another thread), it resets the wait-flag. In addition, if there is a system call facility that will allow other threads to detect if a thread is actually in the wait state, the thread about to execute the suspend( ) operation, T2 in this case, executes the suspend(T1) operation after it knows that T1 is in the wait state. If no such system call facility is available, we use a technique that relies on fairness in thread scheduling. More particularly, a scheduling assumption may be made, i.e., every active thread gets a thread schedule slice of non-trivial amount of time before any other thread gets two schedule slices. In this case, each thread is forced to yield the schedule when it first detects a raised wait-flag. In a system with different priorities associated with threads, if T2 has a higher priority than T1, a mechanism is provided that ensures that T1 is scheduled to execute the wait( ) operation before T2 executes the suspend(T1) operation.

The software tool of the present invention utilizes the logical thread schedule intervals in a replay mode to reproduce the execution behavior of the program. Threads are created by the software tool in the replay mode in the same manner as they are created by the program in the record phase. A simple mapping data structure is used to associate thread identifiers of the threads created in the record phase with thread identifiers of corresponding threads created in the replay phase. Such a data structure may be necessary because the thread id's generated by an operating system in the record phase may not be the same as those generated for the same threads in the replay phase.

Figure 10:
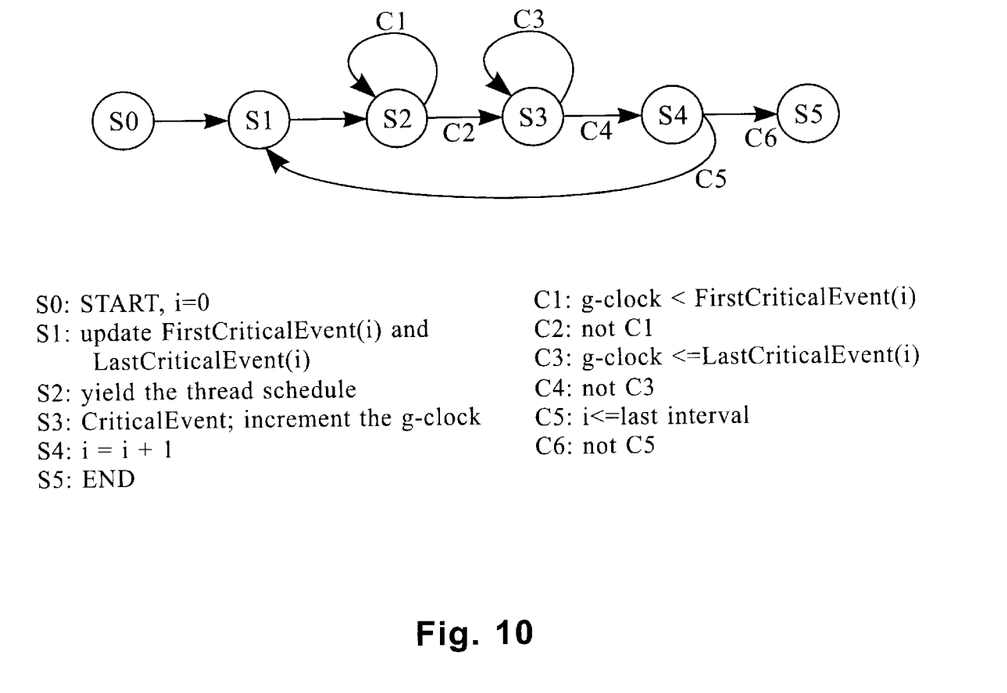
FIG. 10 is a state diagram that illustrates the operation of the software tool of the present invention in replay mode.

The finite state machine of FIG. 10 illustrates an example of the operations performed by the tool in the replay mode in reproducing the execution behavior of the program. State S0 is the initial state of the thread. In state S1, the next schedule interval is identified and the FirstCriticalEvent and LastCriticalEvent identifiers for that schedule interval is identified. As described above, the FirstCriticalEvent and LastCriticalEvent identifiers are preferably represented by global clock values. In state S2, the thread waits until the global clock value becomes the same as the current FirstCriticalEvent at which point it moves to state S3. In a system with different priorities associated with the threads, starvation (livelock) of the lower priority threads is avoided with a mechanism that ensures that lower priority threads will move to state S3 and execute the critical events in the current interval. In state S3, the thread executes a critical event and increments the global clock. Upon execution of the event, the processing system identifies the next event in the execution sequence. This process repeats until the global clock value becomes greater than LastCriticalEvent of the current interval, at which point it moves to state S4. In state S3, the critical events within a specific thread are executed in the same sequential order. In addition, the execution order of critical events across threads is maintained by the global clock values associated with the critical events. Therefore, since the program is given the same inputs in the record and replay phases, the critical events executed for a particular global clock value must be the same in both the record and replay phases. Thus, the tool does not have to identify which critical events to execute—the right ones automatically get executed.

In state S4, the thread increments the current interval number and checks if there exists any more intervals left to process. If so, operation moves back to state S1, and repeats the above steps. If no more intervals are left, it terminates after executing any remaining non-critical events.

The steps performed in state S3 corresponds to GC-critical steps that are executed during the record mode. Note that the steps performed in state S3 as applied to shared variable access critical events may require modification for synchronization critical events because of the semantics of such synchronization operations. Handling such synchronization operations during replay mode is similar to their handling during the record mode. For example, with respect to the monitorenter operation of the Java™ Virtual Machine, the steps performed in state S3 may be applied without modification. In this case, in state S3, the thread must wait for the correct global clock value before executing the monitorenter operation, and increments the global clock after the thread successfully executes monitorenter operation.

While the invention has been described above with respect to particular embodiments thereof, those skilled in the art will recognize that the invention can be practiced with modification within the spirit and scope of the appended claims.

We claim:

1. A program storage device, readable by a machine, tangibly embodying instructions to perform method steps for recording a representation of run-time behavior of a program, wherein said run-time behavior of said program includes sequences of events, each sequence associated with one of a plurality of execution threads, said method steps comprising:

identifying execution order of critical events of said program, wherein said program comprises critical events and non-critical events;

generating groups of critical events of said program,
      wherein, for each given group, critical events belonging to said given group belong to a common execution thread, critical events belonging to said given group are consecutive, and only non-critical events occur between any two consecutive critical events in said given group; and
      wherein said groups are ordered and no two adjacent groups include critical events that belong to a common execution thread;

generating, for each given execution thread, a logical thread schedule that identifies a sequence of said groups associated with said given execution thread, and storing said logical thread schedule in persistent storage for subsequent reuse.

2. The program storage device of claim 1, wherein each of said critical events represent one of a shared-variable access operation and a synchronization operation.

3. The program storage device of claim 1, wherein critical events belonging to a given group are represented by an ordered pair <FirstCriticalEvent, LastCriticalEvent>, wherein FirstCriticalEvent identifies the first critical event in the given group and LastCriticalEvent identifies the last critical event in the given group.

4. The program storage device of claim 1, wherein each critical event is identified by a global clock value that reflects execution order of said critical events.

5. The program storage device of claim 4, wherein critical events belonging to a group are ordered based upon global clock values associated with said critical events, and wherein said groups of critical events are ordered based upon global clock values associated with said critical events.

6. The program storage device of claim 4, wherein said global clock value that identifies a particular critical event is updated within an atomic action.

7. The program storage device of claim 6, wherein, if said particular critical event represents a monitorenter synchronization operation, said particular critical event is executed prior to performing said atomic action that updates said global clock value.

8. The program storage device of claim 6, wherein, if said particular critical event represents a wait synchronization operation, said particular critical event is executed subsequent to performing said atomic action that updates said global clock value.

9. The program storage device of claim 6, wherein, if said particular critical event represents one of a shared-variable access operation, a notify synchronization operation, a notifyAll synchronization operation, a resume synchronization operation, an interrupt synchronization operation, a suspend (self) synchronization operation, and a suspend(other) synchronization operation, said global clock value is updated and said particular critical event is executed within an atomic action.

10. The program storage device of claim 9, further comprising the steps of:
   associating a flag with a thread executing a suspend(self) synchronization operation, wherein said flag when set indicates that said thread executing the suspend(self) synchronization operation has the intent to suspend operation;
   if said particular critical event represents a suspend(self) synchronization operation, setting said flag associated with said thread;
   for threads other the thread executing the suspend(self) synchronization operation that cannot perform atomic actions,
      evaluating said flag to determine if said flag is set;
      upon determining that said flag is set, determining if the thread executing the suspend(self) synchronization operation is in a self-suspended state; and
      if the thread executing the suspend(self) synchronization operation is in a self-suspended state, performing atomic actions associated with the suspend(self) synchronization operation.

11. A program storage device, readable by a machine, tangibly embodying instructions to perform method steps for replaying run-time behavior of a program, wherein said run-time behavior of said program includes sequences of events, each sequence associated with one of a plurality of execution threads, said method steps comprising:
   for each given execution thread, loading from persistent storage a logical thread schedule associated with said given execution thread, wherein said logical thread schedule comprises a sequence of groups of critical events of said program,
      wherein said program comprises critical events and non-critical events,
      wherein, for each given group, critical events belonging to said given group belong to a common execution thread, critical events belonging to said given group are consecutive, and only non-critical events occur between any two consecutive critical events in said given group, and
      wherein said groups are ordered and no two adjacent groups include critical events that belong to a common execution thread;
   for each given execution thread, executing critical events identified by said logical thread schedule associated with said given execution thread.

12. The program storage device of claim 11, wherein each of said critical events represent one of a shared-variable access operation and a synchronization operation.

13. The program storage device of claim 11, wherein critical events belonging to a given group are represented by an ordered pair <FirstCriticalEvent, LastCriticalEvent>, wherein FirstCriticalEvent identifies the first critical event in the given group and LastCriticalEvent identifies the last critical event in the given group.

14. The program storage device of claim 11, wherein each critical event is identified by a global clock value that reflects execution order of said critical events.

15. The program storage device of claim 14, wherein critical events belonging to a group are ordered based upon global clock values associated with said critical events, and wherein said groups of critical events are ordered based upon global clock values associated with said critical events.

16. The program storage device of claim 14, wherein said global clock value that identifies a particular critical event is updated within an atomic action.

17. The program storage device of claim 16, wherein, if said particular critical event represents a monitorenter synchronization operation, said global clock value is updated and said particular critical event is executed within an atomic action.

18. The program storage device of claim 16, wherein, if said particular critical event represents a wait synchronization operation, said particular critical event is executed subsequent to performing said atomic action that updates said global clock value.

19. The program storage device of claim 16, wherein, if said particular critical event represents one of a shared-variable access operation, a notify synchronization operation, a notifyall synchronization operation, a resume synchronization operation, an interrupt synchronization operation, a suspend(self) synchronization operation, and a suspend(other) synchronization operation, said global clock value is updated and said particular critical event is executed within an atomic action.

20. The program storage device of claim 19, further comprising the steps of:
   associating a flag with a thread executing a suspend(self) synchronization operation, wherein said flag when set indicates that said thread executing the suspend(self) synchronization operation has the intent to suspend operation;
   if said particular critical event represents a suspend(self) synchronization operation, setting said flag associated with said thread;
   for threads other the thread executing the suspend(self) synchronization operation that cannot perform atomic actions,
      evaluating said flag to determine if said flag is set;
      upon determining that said flag is set, determining if the thread executing the suspend(self) synchronization operation is in a self-suspended state; and
      if the thread executing the suspend(self) synchronization operation is in a self-suspended state, performing atomic actions associated with the suspend(self) synchronization operation.

21. A program storage device, readable by a machine, tangibly embodying instructions to perform method steps for recording a representation of run-time behavior of a program, wherein said run-time behavior of said program includes sequences of events, each sequence associated with one of a plurality of execution threads, said method steps comprising:

identifying a suspend(self) operation within said sequences of events;

in an atomic action, assigning an identifier to said suspend (self) operation and executing said suspend(self) operation, wherein said identifier identifies execution order of said suspend(self) operation within said sequences of events;

controlling a second thread to complete said atomic action; and storing said identifier in persistent storage for subsequent reuse.

22. The program storage device of claim 21, wherein said identifier is a global clock value that reflects execution order of said critical events.

23. A program storage devices, readable by a machine, tangibly embodying instructions to perform method steps for replaying run-time behavior of a program, wherein said run-time behavior of said program includes sequences of events, each sequence associated with one of a plurality of execution threads, said method steps comprising:

for each given execution thread, loading from persistent storage a thread schedule associated with said given execution thread, wherein said thread schedule identifies sequences of events of said program;

identifying a suspend(self) operation within said sequences of events; and in an atomic action, executing said suspend(self) operations; and controlling a second thread to complete said atomic action in accordance with the thread schedule.

24. The program storage device of claim 23, wherein said suspend(self) operation is identified by a global clock value that reflects execution order of said critical events.

* * * * *